United States Patent [19]

Jung

[11] Patent Number: 6,118,607
[45] Date of Patent: Sep. 12, 2000

[54] METHOD FOR AND APPARATUS FOR ELIMINATING WIGGLE NOISE IN A DISK DRIVE STORAGE DEVICE USING A THIN FILM HEAD

[75] Inventor: Kwang-Jo Jung, Gumi, Rep. of Korea

[73] Assignee: SamSung Electronics Co., Ltd., Suwon, Rep. of Korea

[21] Appl. No.: 09/002,249

[22] Filed: Dec. 31, 1997

[30] Foreign Application Priority Data

Dec. 31, 1996 [KR] Rep. of Korea ................... 96-82605

[51] Int. Cl.⁷ ............................................. G11B 5/09
[52] U.S. Cl. .................................. 360/53; 360/46
[58] Field of Search .................. 360/46, 53, 62

[56] References Cited

U.S. PATENT DOCUMENTS

| 4,727,643 | 3/1988 | Schewe et al. . |
| 5,025,342 | 6/1991 | Nagata et al. . |
| 5,053,892 | 10/1991 | Supino, Jr. et al. . |
| 5,132,859 | 7/1992 | Andricacos et al. . |
| 5,187,860 | 2/1993 | Horibata et al. . |
| 5,189,566 | 2/1993 | Christensen et al. ............... 360/62 |
| 5,245,493 | 9/1993 | Kawabe et al. . |
| 5,276,564 | 1/1994 | Hessing et al. . |
| 5,373,408 | 12/1994 | Bischoff et al. . |
| 5,392,169 | 2/1995 | Argyle et al. . |
| 5,623,378 | 4/1997 | Shibasaki et al. . |
| 5,910,861 | 8/1999 | Ahn ..................................... 360/46 |
| 5,940,234 | 8/1999 | Wilson et al. ....................... 360/53 |

FOREIGN PATENT DOCUMENTS

| 0 590 878 A2 | 4/1994 | European Pat. Off. . |
| 196 42 375 A1 | 7/1997 | Germany . |

Primary Examiner—W. Chris Kim
Attorney, Agent, or Firm—Robert E. Bushnell, Esq.

[57] ABSTRACT

A method for eliminating wiggle noise in a disk drive storage device including a magnetic thin film head and a disk provided with an alternate servo sector and a data sector is characterized by the step of writing deliberately arbitrary data in a data sector following a servo sector where there has occurred an error caused by the wiggle noise during retrieving the servo information, thereby eliminating the wiggle noise.

15 Claims, 5 Drawing Sheets

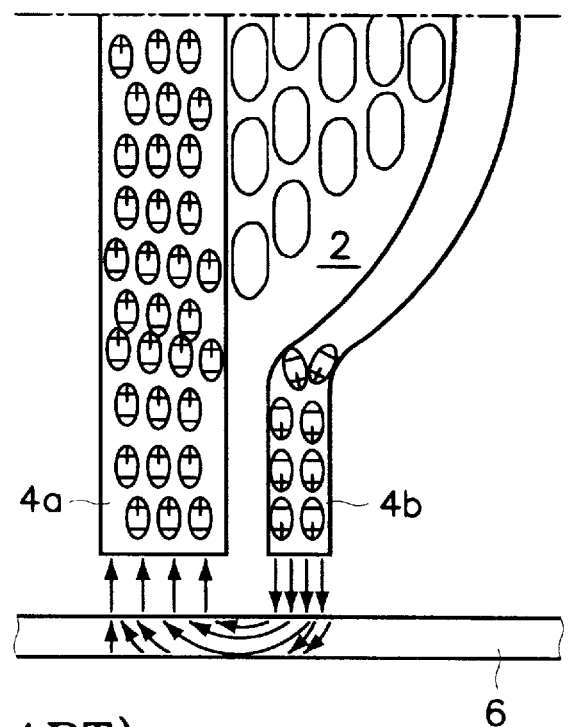
(PRIOR ART)
FIG. 1A
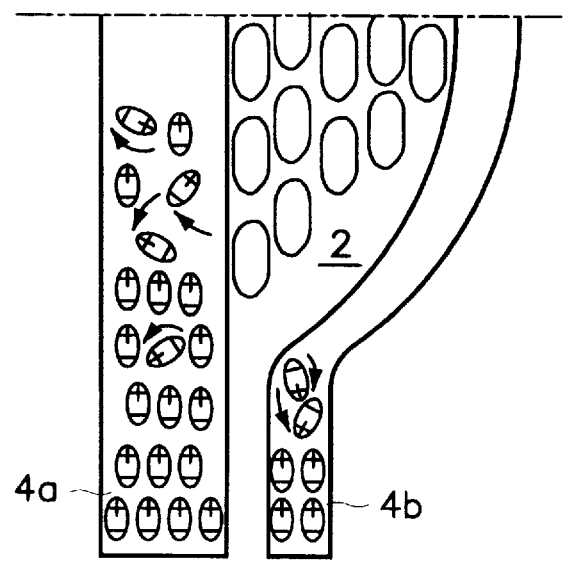
(PRIOR ART)
FIG. 1B

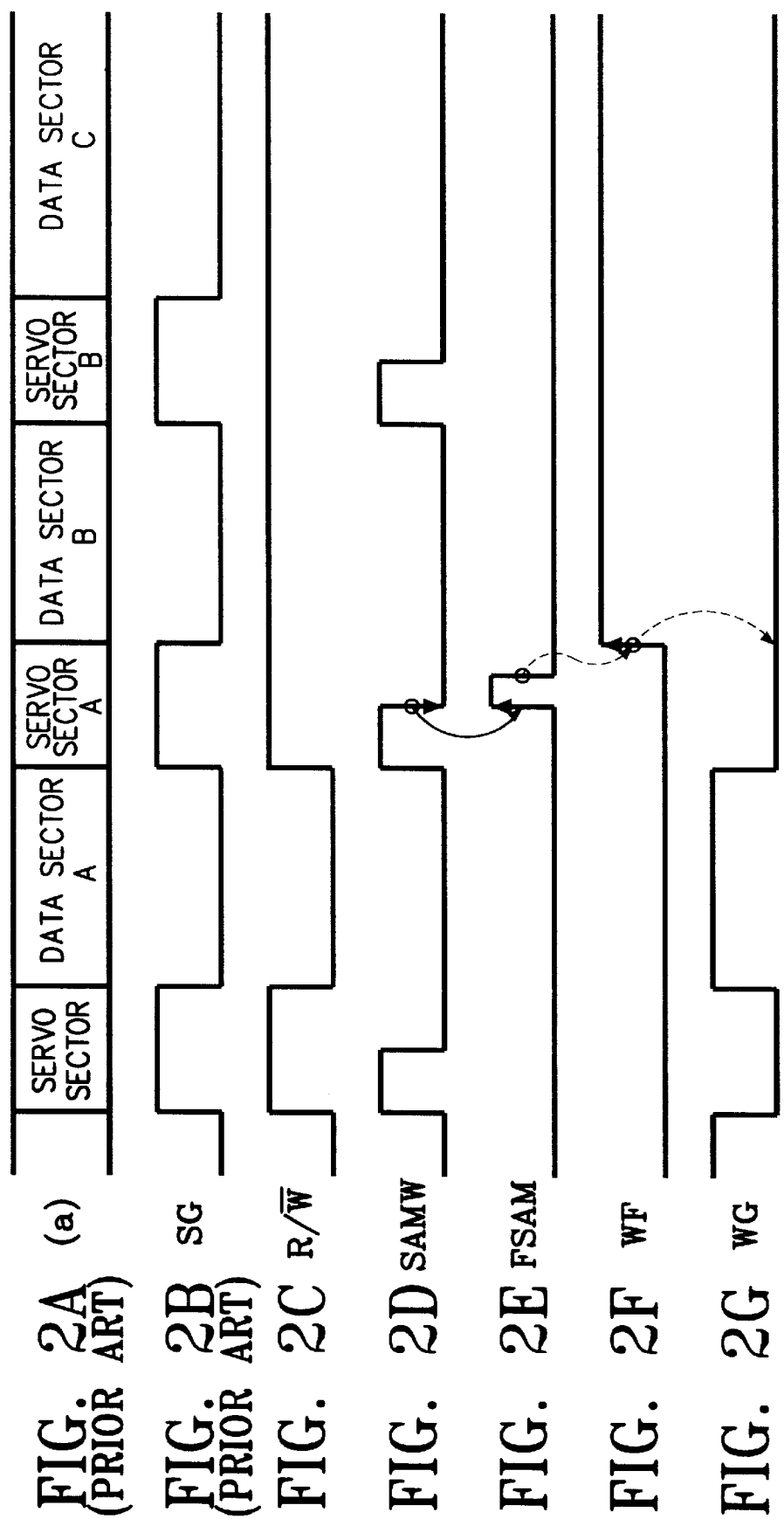

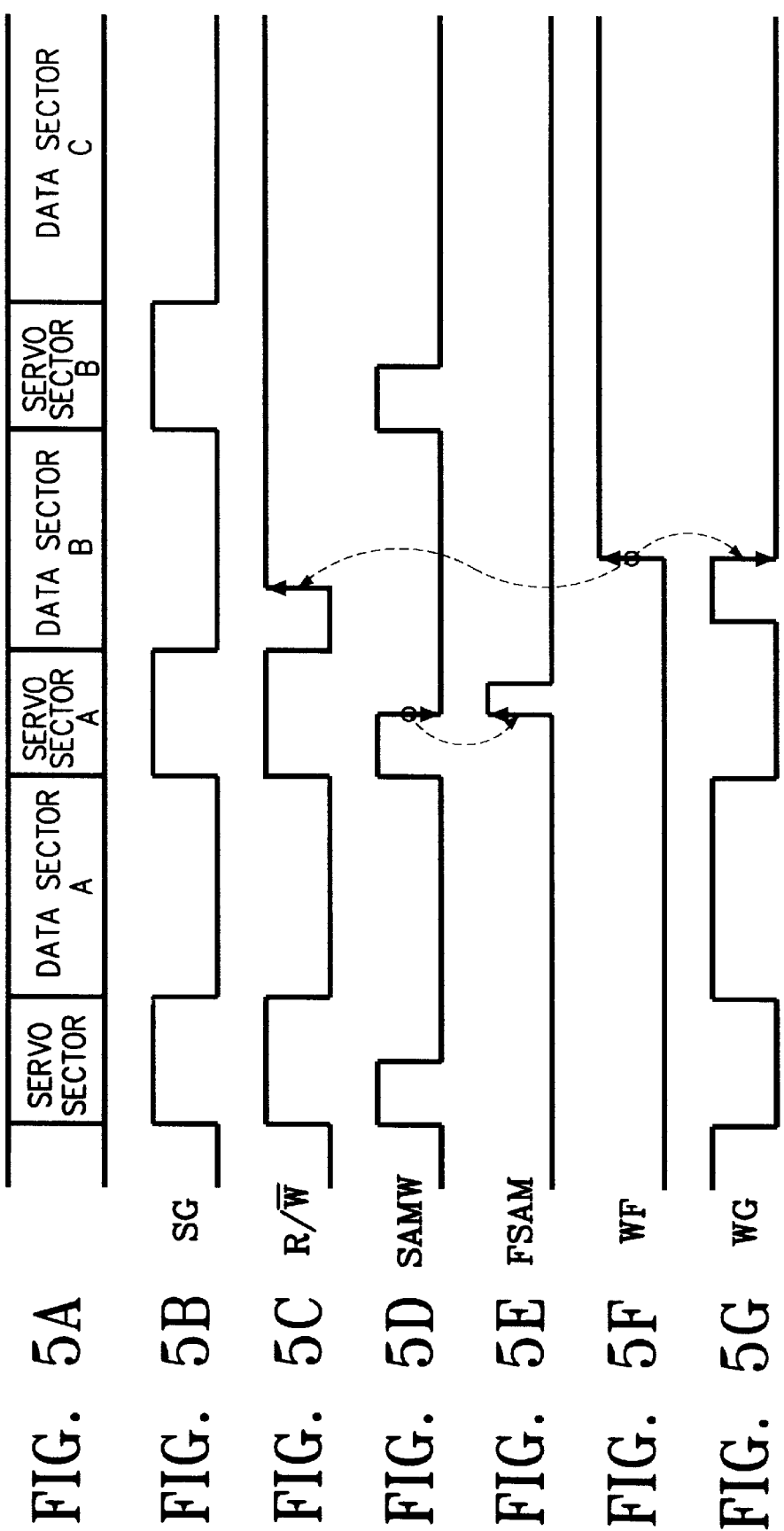

METHOD FOR AND APPARATUS FOR ELIMINATING WIGGLE NOISE IN A DISK DRIVE STORAGE DEVICE USING A THIN FILM HEAD

CLAIM FOR PRIORITY

This application makes reference to, incorporates the same herein, and claims all benefits accruing under 35 U.S.C. § 119 from an application for METHOD FOR ELIMINATING WIGGLE NOISE IN A DISK DRIVE STORAGE DEVICE WITH THIN FILM HEADS earlier filed in the Korean Industrial Property Office on Dec. 31, 1996, and there duly assigned Ser. No. 82605/1996, a copy of which application is annexed hereto.

BACKGROUND OF THE INVENTION

1. Technical Field

The present invention relates to elimination of wiggle noise in a disk drive storage device using a magnetic thin film head, and more particularly a method for eliminating wiggle noise generated from a magnetic thin film head of a disk drive storage device during retrieving servo information of a servo sector after writing data in such a disk drive storage device.

2. Related Art

Disk drive storage devices such as hard disk drives (HDDs) and floppy disk drives (FDDs) are widely used as auxiliary memory devices for computer systems. In particular, HDDs are commonly used to store a large quantity of data as well as to provide high speed access to stored data in computer systems. In order to maximize data storage capacity of a HDD, the track density of the disk (TPI) must be increased, and the transducer head must also be highly reliable.

One common type of highly reliable transducer heads is a thin-film head having a core formed by employing semiconductor fabrication technology as disclosed, for example, in U.S. Pat. No. 4,727,643 for Method For Manufacturing A Magnetic Head By A Thin Film Technique issued to Schewe et al., U.S. Pat. No. 5,025,342 for Thin-Film Magnetic Head Device For Recording And Reproducing issued to Nagata et al., U.S. Pat. No. 5,132,859 for Thin Film Structures For Magnetic Recording Heads issued to Andricacos et al., U.S. Pat. No. 5,187,860 for Method Of Manufacturing Thin Film Magnetic Head issued to Horibata et al., U.S. Pat. No. 5,245,493 for Magnetic Information Storage Apparatus Including Magnetic Head And Method For Making Magnetic Head issued to Kawabe et al., and U.S. Pat. No. 5,373,408 for Configuring Domain Pattern In Thin Films Of Magnetic Heads issued to Bischoff et al. Other types of transducer head with high disk density are disclosed, for example, in U.S. Pat. No. 5,623,378 for Signal Reproducing Circuit Adopted For Head Utilizing Magneto-Resistive Effect With Control For Reducing Transient Period Between Read And Write States issued to Shibasaki. Generally, a thin-film transducer head may increase data write density, but experiences various problems relating to electrical characteristics of the head poles. A typical problem relating to the electrical characteristics of the head poles is the so-called wiggle noise which is noise generated due to variation of a magnetic field when the HDD is switched from a data write operation to a data read operation. This type of noise often interferes with the retrieval of correct information (servo information or data information). In addition, if the wiggle noise is so severe that servo information cannot be retrieved, servo control cannot be performed. Moreover, if the wiggle noise is generated with the thin-film head ("head") shifting to a servo sector after writing data in a data sector, the servo address mark is not normally detected during a servo address mark interval, and the head must be moved to a parking zone (or spare sector) to perform a dummy write operation, and then retrieve servo information from the servo sector of the track. If the head must move to the parking zone or spare sector (PAD between sectors) to eliminate the wiggle noise which occurs during retrieving the servo information, the time for accessing data is undesirably delayed, and thereby degrading the overall performance of the disk drive.

SUMMARY OF THE INVENTION

Accordingly, it is an object of the present invention to provide an improved hard disk drive using a thin film head for recording and reproducing data information from a magnetic disk free from wiggle noise.

It is also an object to provide a method for eliminating wiggle noise caused by cutting off a write current without moving a thin-film head in a disk drive.

It is further an object to provide a method for eliminating wiggle noise in a disk drive storage device including a magnetic thin film head and a magnetic disk having an alternate servo sector and data sectors by deliberately writing an arbitrary data in the data sector following a servo sector where there has occurred an error caused by wiggle noise during retrieving the servo information.

These and other objects of the present invention can be achieved by a method for eliminating wiggle noise in a hard disk drive including a magnetic thin film head and a magnetic disk provided with an alternate servo sector and a data sector per track, comprising the steps of: determining whether there occurs a servo information retrieving error when shifting from a data write mode to a servo information retrieving mode; executing servo control by employing servo information retrieved from the previous servo sector when there occurs a servo information retrieving error; and deliberately writing arbitrary data in the data sector following the servo sector where there has occurred the servo information retrieving error in order to eliminate the wiggle noise.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein:

FIGS. 1A and 1B are partial cross-sectional views of the core of a thin-film head with two poles with alignment of the magnetic dipoles of the poles respectively before and after cutting off write current;

FIGS. 2A to 2G are timing diagrams of various control signals enabled or disabled because of wiggle noise in a hard disk drive (HDD);

FIGS. 5A to 5G are timing diagrams of various control signals when wiggle noise is eliminated according to the embodiment of the present invention.

DETAILED DESCRIPTION OF THE PREFERRED EMBODIMENT

Figure 3:
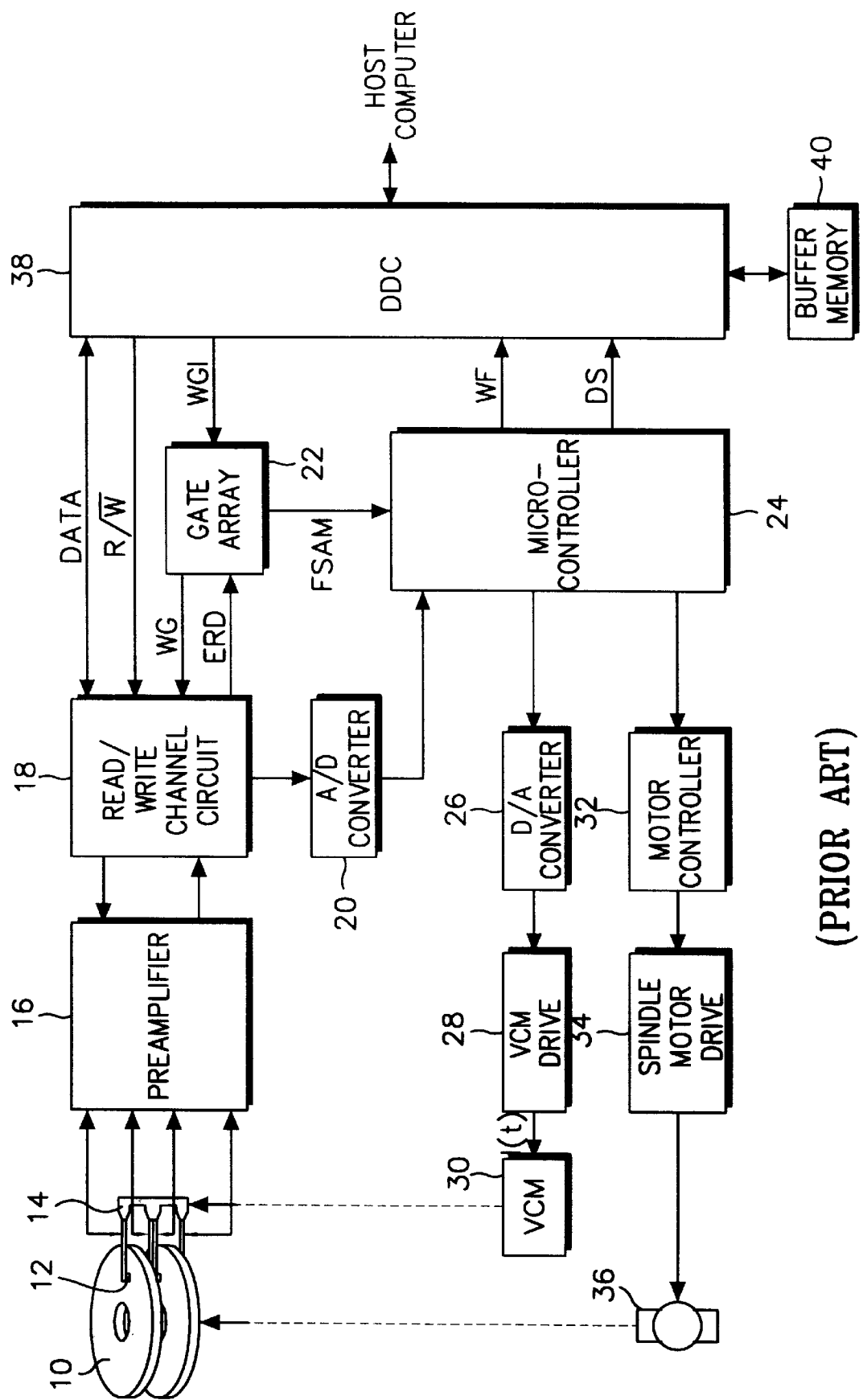
FIG. 3 illustrates a hard disk drive (HDD)

Referring now to the drawings and particularly to FIGS. 1A and 1B, which illustrate a thin film magnetic head for use in a hard disk drive (HDD) with a magnetic polarity arrangement of top and bottom poles 4a and 4b separated by a transducer gap when a data write current is applied as shown in FIG. 1A, and is then cut off as shown in FIG. 1B. Conductive coil 2 such as copper is arranged to extend between the top and bottom poles 4a and 4b and is electrically insulated from the head poles 4a and 4b.

When a write current is applied to the thin film magnetic head during a data write operation, magnetic dipoles of the head poles 4a and 4b are arranged in a given direction as shown in FIG. 1A, that is, the magnetic flux lines are produced in a direction centered around the transducer gap disposed between the top and bottom poles 4a and 4b which magnetizes a magnetic layer of a magnetic disk to write data information during a data write operation until the write current is cut off.

When the write current is cut off, the magnetic dipoles of the head poles 4a and 4b are randomly displaced with an entropy increase, as shown in FIG. 1B, which causes a variation in the magnetic field. Such a variation of the magnetic field induces a current in the conductive coil 2 which current is called a wiggle noise due to a domain pinning phenomenon. This wiggle noise makes it impossible to retrieve a correct information (servo information or data information) because the retrieved signal is affected with residual energy due to the write current. Further, if the wiggle noise is so severe that servo information cannot be retrieved, servo control cannot be performed.

A contemporary technique for eliminating wiggle noise which often occurs in the HDD may be described in connection with various control signals as shown in FIGS. 2A to 2G. FIG. 2A represents a sector format of a given track of a magnetic disk provided with an alternate servo sector and a data sector. FIG. 2B illustrates a timing diagram of a servo gate signal SG which is enabled to retrieve servo information recorded in the servo sector of the track. FIG. 2C illustrates a timing diagram of a read/write signal for reading and writing data information from the alternate servo sector and data sector of the given track. FIG. 2D illustrates a timing diagram of a servo address mark window signal SAMW which is enabled to detect the servo address mark in a given interval of the servo sector. FIG. 2E illustrates a fault servo address mark signal FSAM which is generated if the servo address mark signal recorded in the servo sector is not detected. FIG. 2F illustrates a write fault signal WF which is set at the end of the servo sector if not detecting the servo address mark, and FIG. 2G illustrates a write gate signal WG which is enabled to write given data in the data sector.

If the wiggle noise is generated with the thin film magnetic head shifting to the servo sector "A" after writing given data in the data sector "A" as shown in FIG. 2A, the servo address mark is not normally detected during the SAMW interval such that the fault servo address mark FSAM signal is set and applied to a drive controller (not shown) with the SAMW being disabled. Upon receipt of the FSAM pulse, the drive controller sets the write fault signal WF to retrieve the servo information from the servo sector A after temporarily stopping the data write operation. If the fault servo address mark FSAM signal is received continuously due to serious wiggle noise, the drive controller moves the head to a parking zone (or spare sector) prepared to perform a dummy write operation, thereby stabilizing the arrangement of the magnetic dipoles of the head. Finally, the drive controller moves the head to retrieve the servo information from the track of the servo sector A. However, such a technique must remove the head to the parking zone or spare sector (PAD between sectors) prepared to eliminate wiggle noise whenever there occurs an error in retrieving the servo information, so that the time for accessing data is undesirably delayed and thereby degrading the overall performance of the disk drive.

Turning now to FIG. 3, which illustrates a hard disk drive (HDD) using thin film magnetic heads according to the principles of the present invention. As shown in FIG. 3, the hard disk drive includes, for example, two magnetic disks 10 and corresponding four transducer heads 12, a transducer head assembly 14 in an E-shape having actuator arms each for supporting a respective pair of transducer heads 12, a preamplifier 16, a read/write channel circuit 18, an analog-to-digital (A/D) converter 20, a gate array 22, a micro-controller 24, a digital-to-analog (D/A) converter 26, a voice coil motor (VCM) driver 28, a voice coil motor 30, a motor controller 32, a spindle motor driver 34, a spindle motor 36 for rotating the magnetic heads 12 across the surface of the disk 10, a disk data controller (DDC) 38, and a buffer memory 40. The disk is generally formed with a plurality of concentric tracks each including a data zone and a parking zone where the transducer head 12 is parked when the hard disk drive (HDD) is turned off.

Preamplifier 16 is electrically connected to the transducer head assembly 14 for amplifying a predetermined signal read out from the disk 10 using the transducer head 12 and transmitting the amplified signal to the read/write channel circuit 18. For the purpose of writing data onto the disk 10, the preamplifier 16 applies encoded writing data transmitted from the read/write channel circuit 18 to a designated transducer head from the four magnetic heads 12 to be recorded on the disk 10. At this time, the preamplifier 16 selects one of the magnetic heads 12 according to a control signal generated from a disk data controller (DDC) 38 under the instruction of a micro-controller 24.

Read/write channel circuit 18 is connected between the preamplifier 16 and the DDC 38 for decoding data pulses from an input signal received from the preamplifier 16 to generate encoded read data ERD, and for decoding write data WDATA received from the DDC 38 to transmit the decoded WDATA to the preamplifier 16. The read/write channel circuit 18 also carries out a data read/write operation in accordance with a read/write R/W signal. In addition, the read/write channel circuit 18 generates a phase error signal (PES) by decoding head position information, i.e., a part of servo information, which is recorded on the disk. The PES is then transmitted to the micro-controller 24 via the A/D converter 20. At this stage, the A/D converter 20 converts the PES into a digital value corresponding to a predetermined level and transmits the converted PES to the micro-controller 24.

Gate array 22 is connected between the read/write channel circuit 18 and the micro-controller 24 for detecting from the encoded read data ERD and applying a fault servo address mark FSAM to the micro-controller 24 to carry out the servo control. The gate array 22 includes logic gates for facilitating the interface between various components, and generates a write gate WG signal from the DDC 38 upon receipt of a write gate input signal WGI. The DDC 38 is controlled by the micro-controller 24 to record the data received from a host computer via the read/write channel circuit 18 and the preamplifier 16 or to transmit the data read out from the disk 10 to the host computer.

Micro-controller 24 controls the DDC 38 according to a data read/write command received from the host computer to perform track seeking and track following operations. In doing so, the micro-controller 24 uses the track number and the PES input from the gate array 22 and the A/D converter 20, respectively, and generates data pulses DS corresponding to various servo control signals. The D/A converter 26 is connected to the micro-controller 24 for converting the digital signal output from the micro-controller 24 into an analog signal for controlling the position of the transducer heads 12. A VCM driver 28 generates a driving current for driving a VCM 30 according to the analog signal input from the D/A converter 26. The VCM 30 drives the transducer heads 12 to move in a radial direction of the disk 10 corresponding to the level of the driving current input from the VCM driver 28. Motor controller 32 is connected to the micro-controller 24 for controlling a spindle motor driver 34 according to a disk rotation control command output from the micro-controller 24. The spindle motor driver 34 drives a spindle motor 36 in accordance with the control of the motor controller 32 to thereby rotate the disk 10.

DDC 38 controls most of digital signals of the data channel of the HDD to perform various functions such as interfacing with the host computer, controlling the format of the data recorded on the disk 10, managing a buffer memory 40, correcting errors of retrieved data, etc. The DDC 38 also generates the read/write bar signal R/W̄ delivered to the read/write channel circuit 18 in response to data sector pulses DS and WF supplied by the micro-controller 24. The buffer memory 40 connected temporarily stores the data transferred between the disk 10 and host computer under the control of the DDC 38.

Now, a process for eliminating wiggle noise according to the principles of the present invention will be described in detail with reference to FIGS. 3 to 5 hereinbelow.

Figure 4:
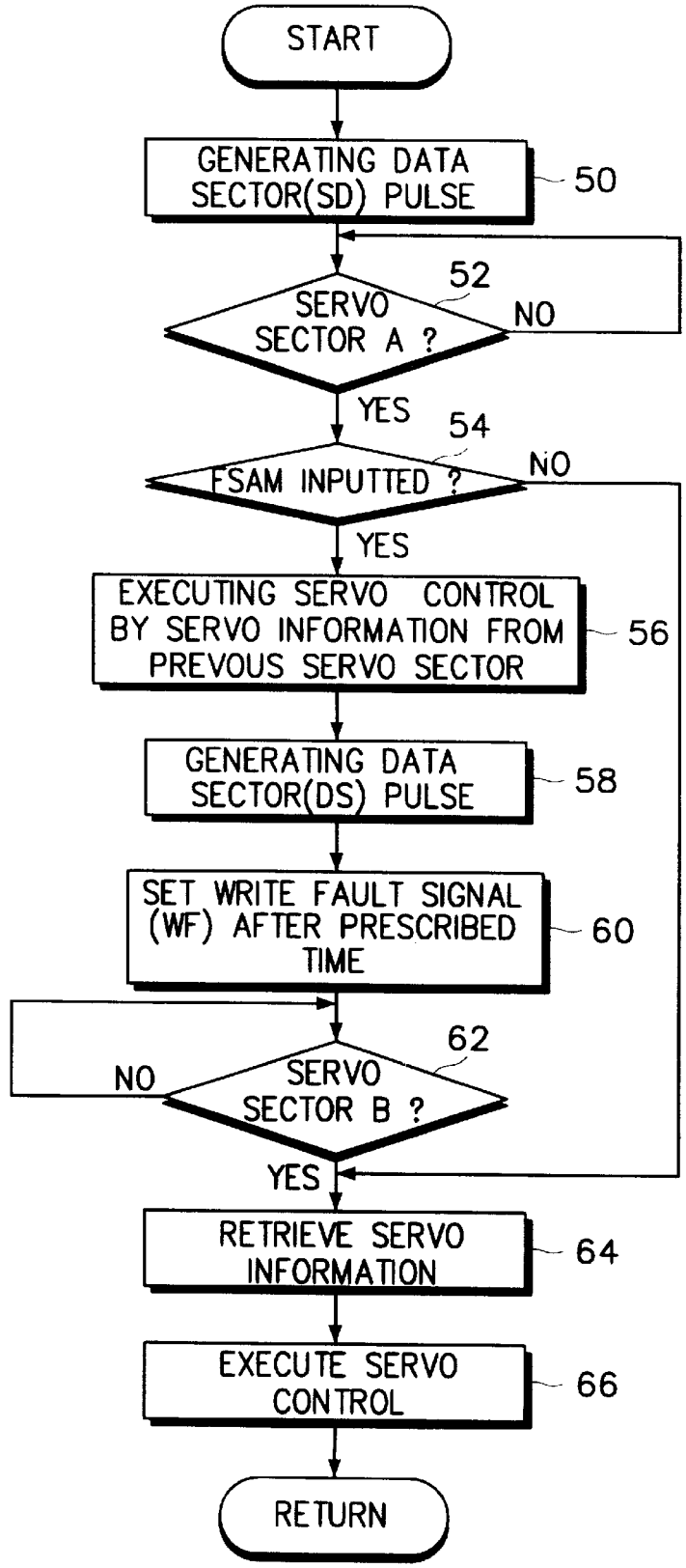
FIG. 4 is a flow chart of a process of eliminating wiggle noise according to an embodiment of the present invention.

First, the micro-controller 24 disposes the head 12 in a target track provided with an alternate servo sector and a data sector as shown in FIG. 5A in response to a data write command from the host computer and generates a data sector pulse DS applied to the DDC 38 for enabling writing received data in a data sector A at step 50 shown in FIG. 4. Then the DDC 38 generates a read/write bar signal R/W̄ of a low level as shown in FIG. 5C to write the received data in the data sector A. In step 52, the micro-controller 24 checks whether the position of the head is in the servo sector A. If the bead is positioned at servo sector A at step 52, the micro-controller 24 determines whether a fault servo address mark FSAM signal as shown in FIG. 5E is input from the gate array 22 at step 54. If there occurs a serious wiggle noise due to the interruption of a write current, which has been applied to the head 12 to write data in the data sector A, the servo address mark of the servo sector A is not detected during the interval of a servo address mark window SAMW which is enabled as shown in FIG. 5D. Accordingly, when the fault servo address mark FSAM signal is input at the time of the SAMW being enabled in the servo sector A, the micro-controller 24 executes the servo control by the servo information retrieved from the servo sector previous to the data sector A at step 56 regardless of the FSAM. Thereafter, the micro-controller 24 generates a data sector pulse DS applied to the DDC 38 at the time of a servo gate signal SG as shown in FIG. 5B being disabled at step 58. The data sector pulse DS causes the head 12 to write data in the data sector B, so that the arrangement of the magnetic dipoles of the head 12 recovers from the instability.

In step 60, the micro-controller 24 sets a write fault signal WF as shown in FIG. 5F after a prescribed time from the generation of the data sector pulse DS so as to disable a write gate signal WG as shown in FIG. 5G and change the read/write bar signal R/W from a low level to a high level for application to the read/write channel circuit 18. Accordingly, the write current applied to the head 12 in the data sector B is cut off to change the operational mode of the disk drive to the data retrieving mode. Thereafter, detecting the servo sector B at step 62, the micro-controller 24 retrieves the servo information in step 64 to execute the servo control at step 66, finally returning to the main servo control flow. Thus, the wiggle noise generated when shifting from the data write mode to the servo information retrieving mode is fully eliminated in the data sector following the servo sector, thereby making the micro-controller execute the servo control without errors.

As described above, the present invention provides means to effectively eliminate wiggle noise generated from cutting off the write current without moving the thin-film head, so that the time for accessing the data is not delayed and thereby improving the drive performance.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A method for eliminating wiggle noise in a disk drive storage device comprising the steps of:

providing a magnetic disk including alternate servo sectors and data sectors;

providing a thin film head for recording and reproducing data information on and from said magnetic disk;

controlling said thin film head to write data in a data sector of said data sectors during a data write operation;

detecting when a read error occurs caused by said wiggle noise during a servo information retrieving mode from a servo sector of said servo sectors of said magnetic disk following said data write operation; and writing, during a following data write operation, arbitrary data information in a data sector of said data sectors of said magnetic disk following said servo sector where said read error occurs when said read error is detected.

2. The method of claim 1, further comprised of said following data write operation being initiated in response to receipt of a write gate signal exhibiting a high state.

3. The method of claim 2, further comprised of said write gate signal being disabled servo sense to receipt of a write fault signal.

4. The method of claim 3, further comprised of executing servo control when said read error is detected by employing servo information retrieved from a servo sector of said servo sectors previous to said servo sector where said read error occurs due to said wiggle noise.

5. The method of claim 1, further comprised of executing servo control when said error is detected by employing servo information retrieved from a servo sector of said error sectors previous to said servo sector where said read error occurs due to said wiggle noise.

6. A method for eliminating wiggle noise in a hard disk drive, comprising the steps of:

providing a magnetic disk including alternate servo sectors and data sectors per track;

providing a thin film head for writing and retrieving information from said magnetic disk;

determining whether there occurs a servo information retrieving error when shifting from a data write mode to a servo information retrieving mode;

executing servo control by employing servo information retrieved from a servo sector of said servo sectors previous to a servo sector of said servo sectors where said servo information retrieving error occurs when there occurs said servo information retrieving error; and writing arbitrary data in a data sector of said data sectors following said servo sector where there has occurred said servo information retrieving error to thereby eliminate said wiggle noise.

7. The method of claim 6, further comprised of said writing arbitrary data being initiated in response to receipt of a write gate signal exhibiting a high state.

8. The method of claim 7, further comprised of said write gate signal being disabled in response to receipt of a write fault signal.

9. The method of claim 8, further comprised of executing said servo control by employing said servo information retrieved from said servo sector previous to said servo sector where said servo information retrieving error occurs when a read error occurs due to said wiggle noise.

10. The method of claim 6, further comprised of executing said servo control by employing said servo information retrieved from said servo sector previous to said servo sector where said servo information retrieving error occurs when a read error occurs due to said wiggle noise.

11. A hard disk drive, comprising:

a magnetic disk having a plurality of concentric tracks each track provided with alternate servo sectors and data sectors;

a thin film head for reading data from said magnetic disk and writing data to said magnetic disk; and a controller for controlling data read operations and data write operations, said controller eliminating wiggle noise when occurring by:

determining whether there occurs a servo information retrieving error when shifting from a data write mode to a servo information retrieving mode;

executing servo control by employing servo information retrieved from a servo sector of said servo sectors previous to a servo sector of said servo sectors where said servo information retrieving error occurs when there occurs said servo information retrieving error; and writing arbitrary data in a data sector of said data sectors following said servo sector where there has occurred said servo information retrieving error to thereby eliminate said wiggle noise.

12. The hard disk drive of claim 11, further comprised of said writing arbitrary data being initiated in response to receipt of a write gate signal exhibiting a high state.

13. The hard disk drive of claim 12, further comprised of said write gate signal being disabled in response to receipt of a write fault signal.

14. The hard disk drive of claim 13, further comprised of said controller executing said servo control by employing said servo information retrieved from said servo sector previous to said servo sector where said servo information retrieving error occurs when a read error occurs due to said wiggle noise.

15. The hard disk drive of claim 11, further comprised of said controller executing said servo control by employing said servo information retrieved from said servo sector previous to said servo sector where said servo information retrieving error occurs when a read error occurs due to said wiggle noise.

* * * * *